United States Patent
Gomolko

(10) Patent No.: US 10,161,433 B2
(45) Date of Patent: Dec. 25, 2018

(54) COUPLING WITH SECURING PIN

(71) Applicant: SAFRAN ELECTRONICS & DEFENSE, Boulogne Billancourt (FR)

(72) Inventor: Oleg Gomolko, Boulogne Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 15/507,919

(22) PCT Filed: Sep. 1, 2015

(86) PCT No.: PCT/EP2015/069967
§ 371 (c)(1),
(2) Date: Mar. 1, 2017

(87) PCT Pub. No.: WO2016/034593
PCT Pub. Date: Mar. 10, 2016

(65) Prior Publication Data
US 2017/0292554 A1    Oct. 12, 2017

(30) Foreign Application Priority Data
Sep. 1, 2014  (FR) .................................... 14 58173

(51) Int. Cl.
| | |
|---|---|
| *F16B 21/12* | (2006.01) |
| *F16D 9/06* | (2006.01) |
| *F16B 21/16* | (2006.01) |
| *F16B 39/08* | (2006.01) |
| *B60D 1/02* | (2006.01) |
| *F16B 21/14* | (2006.01) |

(52) U.S. Cl.
CPC .............. *F16B 21/12* (2013.01); *F16B 21/16* (2013.01); *F16B 39/08* (2013.01); *F16D 9/06* (2013.01); *B60D 1/025* (2013.01); *F16B 2021/14* (2013.01)

(58) Field of Classification Search
CPC . F16D 9/00; F16D 9/09; Y10T 403/11; F16B 21/12; F16B 21/16
USPC ..................................................... 464/32, 33
See application file for complete search history.

(56) References Cited

U.S. PATENT DOCUMENTS

| | | | |
|---|---|---|---|
| 1,849,174 A | 3/1932 | Carter | |
| 2,566,690 A * | 9/1951 | Wright | ...................... F16D 9/06 244/99.9 |
| 2,698,528 A | 1/1955 | Boesch, Jr. | |
| 2,916,897 A * | 12/1959 | Stokking, Jr. | ............. F16D 9/06 416/244 B |

(Continued)

*Primary Examiner* — Jonathan P Masinick
(74) *Attorney, Agent, or Firm* — Muncy, Geissler, Olds & Lowe, P.C.

(57) ABSTRACT

A coupling comprising a driven part and a driving part that is connected by a safety pin so as to drive the driven part together with the driving part in a travel direction, one of the parts having a male portion engaged in a female portion of the other part, the male and female portions respectively having a first guide surface and a second guide surface facing each other in such a manner that, in the event of the pin breaking, the driving part is capable of moving relative to the driven part in the travel direction, the pin extending perpendicularly to said direction through corresponding holes made in the male and female portions, the coupling being characterized in that the hole made in the male portion opens out in the bottom of a setback in the second guide surface.

5 Claims, 1 Drawing Sheet

(56) References Cited

U.S. PATENT DOCUMENTS

| | | | |
|---|---|---|---|
| 3,405,541 A | | 10/1968 | Whitfield et al. |
| 3,866,367 A | * | 2/1975 | Strizki .................... E01F 7/045 |
| | | | 248/694 |
| 4,086,012 A | * | 4/1978 | Buckley .................... B63B 1/28 |
| | | | 114/279 |
| 4,621,982 A | * | 11/1986 | Schulz ................. B60G 17/056 |
| | | | 403/2 |
| 5,873,784 A | * | 2/1999 | Iwasaki .................... B62D 5/04 |
| | | | 403/2 |
| 6,669,393 B2 | * | 12/2003 | Schilling .................. F02C 7/20 |
| | | | 244/54 |

\* cited by examiner

COUPLING WITH SECURING PIN

BACKGROUND OF THE INVENTION

Field of the Invention

The present invention relates to the transmission of movement between a driven part and a driving part, and more particularly to a coupling for coupling a driven part to a driving part by means of a safety pin.

Brief Discussion of the Related Art

Such a coupling generally comprises a male portion that is secured to one of the parts and received in a female portion that is secured to the other part. The transmission of force from the driving part to the driven part is performed by a safety pin extending perpendicularly to said direction through corresponding holes made in the male and female portions.

The safety pin is designed to have shear strength sufficient to transmit forces that are below a threshold: above the threshold, the safety pin breaks in order to protect the driving part and/or the driven part and/or elements that are connected to said parts from excessive force.

Once the safety pin has broken, if the movement of the driving part is not interrupted, the driving part must be capable of moving relative to the driven part without driving the driven part. The female portion and the male portion thus ensure relative guidance of the parts, and to this end they include guide surfaces that have the holes for receiving the safety pin passing therethrough.

That said, after the pin has broken, friction between the female portion and the male portion is usually very high, and can lead to the two portions seizing together. Movement thus continues to be transmitted, at least to some extent, despite the safety pin breaking.

A solution is to use a harder material for the male portion or to harden the material using a heat treatment. However, that increases the cost of the part considerably.

SUMMARY OF THE INVENTION

An object of the invention is to provide means for making the operation of such couplings more reliable.

In known couplings, the purpose of the guide surfaces, in addition to providing guidance, is to act as "shears" for cutting the pin. Experiments have shown that seizing results from the male portion being deformed at the opening of the hole in the second guide surface: a bead forms on the side where the safety pin bears against the edge of the hole before breaking and said bead comes to rub against the first guide surface.

According to the invention, there is provided a coupling comprising a driven part and a driving part connected by a safety pin so as to drive the driven part with the driving part in a travel direction. One of the parts has a male portion engaged in a female portion of the other part. The male and female portions respectively have a first guide surface and a second guide surface facing each other in such a manner that, in the event of the pin breaking, the driving part is capable of moving relative to the driven part in a travel direction. The pin extends perpendicularly to said direction through corresponding holes made in the male and female portions. The hole made in the male portion opens out in the bottom of a setback in the second guide surface.

The hole made in the female portion opens out into the bottom of the setback and not directly in the second guide surface. Thus, in the invention, the guide surface for guiding the male element no longer acts as a shear blade, this action being performed by the zone at the bottom of the setback surrounding the opening of the hole receiving the safety pin. The bead formed in said zone when the pin breaks is therefore contained, at least in part, in the setback, limiting the risk of seizing. Preferably, the setback has a depth such that the pin works essentially in shear and that is greater than a theoretical height of a bead formed in the zone where the pin bears against the bottom of the setback when the pin breaks.

In theory, the risk of seizing is thus eliminated.

Other characteristics and advantages of the invention appear on reading the following description of particular, non-limiting embodiments of the invention.

BRIEF DESCRIPTION OF THE DRAWINGS

Reference is made to the accompanying drawing, in which.

DETAILED DESCRIPTION OF THE PREFERRED EMBODIMENTS

Figure 1:
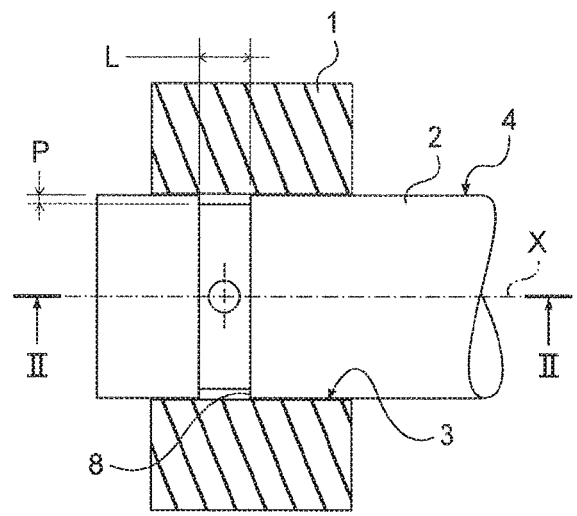
FIG. 1 is a longitudinal section view of a coupling of the invention, the section plane being perpendicular to the pin.
Figure 2:
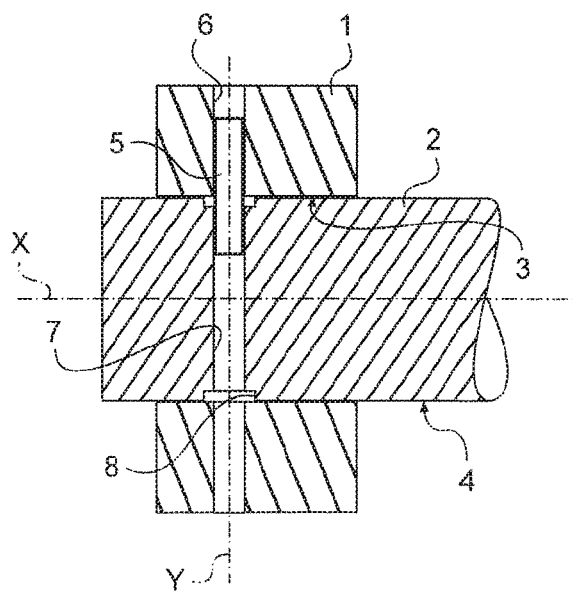
FIG. 2 is a section view of the coupling on line II-II of FIG. 1.

With reference to the figures, the coupling of the invention comprises a driven part and a driving part that is connected by a safety pin so as to drive the driven part together with the driving part in rotation about an axis of rotation X (i.e. in a circumferential travel direction).

The driven part has a male portion 2 engaged in a female portion 1 of the driving part.

The female portion 1 has a first guide surface 3, of cylindrical shape, and the male portion has a second guide surface 4, also of cylindrical shape, facing the guide surface 3. The fit between the two guide surfaces 3, 4 is of the sliding type so as to enable the male portion 2 to be guided relative to the female portion 1. The safety pin 5—that connects the male portion 2 (thus the driven part) to the female portion 1 (and therefore to the driving part)—extends through mutually corresponding holes 6, 7 made respectively in the female portion 1 and in the male portion 2. The holes 6, 7 extend along an axis Y that is perpendicular to the axis X and thus also perpendicular to the travel direction.

The hole 7 made in the male portion 2 opens out in the bottom of a setback 8 made in the second guide surface 4. In this example, the setback 8 is an annular groove having an axis of revolution that coincides with the axis of rotation X of the driving part. The groove has a width L that is greater than the diameter of the hole 7, including manufacturing tolerances for the hole (diameter, positioning . . . ).

The safety pin 5 is designed to have shear strength sufficient to transmit forces that are below a threshold: above the threshold, the safety pin 5 breaks in order to protect the driving part and/or the driven part and/or elements that are connected to said parts from excessive force.

Thus, in the event of the pin breaking, the driving part is capable of moving relative to the driven part in the travel direction.

The setback 8 has a depth P that is:
such that the safety pin 5 works essentially in shear (the shallower the setback 8 the smaller the bending of the safety pin 5); and
above a theoretical height of a bead formed when the safety pin 5 breaks, in the zone in which the safety pin 5 bears against the bottom of the setback 8 (i.e. at the edge of the opening of the hole 7 into the setback 8).

In this example, the setback 8 has a depth lying in the range about 0.1 millimeters (mm) to 0.3 mm, and more particularly 0.2 mm. The depth P is also selected as a function of the materials used. In this example, the parts and the safety pin 5 are made of the same material, namely steel for example. In this example, the steel selected is of the Z15C17-3 or 15-5PH type.

It should be observed that once the safety pin 5 has broken, a portion of the pin 5 may remain projecting into the setback 8 (particularly with increasing depth of said setback). This is advantageous when transmitting movement in rotation since the projecting portion of the safety pin 5 will impede relative movement between the parts in translation without impeding relative movement between the parts in rotation. The width L of the setback 8 is greater than the diameter of the safety pin 5 so as not to impede relative movement in rotation.

Naturally, the invention is not limited to the embodiments described but encompasses any variant coming within the ambit of the invention as defined by the claims.

In particular, although the invention is described in relation to transmitting movement in rotation, the invention can be used in a system for transmitting movement in translation.

The setback need not be an annular groove and may be of a shape that is different, in particular a cylindrical shape.

Materials other than those mentioned may be used. The parts and the safety pin may be made from different materials.

The coupling may have a structure that is different from that described. The male portion may be secured to the driving part and the female portion may be secured to the driven part. The safety pin may pass right through the male portion and the female portion.

The invention claimed is:

1. A coupling comprising a driven part and a driving part that is connected by a safety pin so as to drive the driven part together with the driving part in a travel direction, one of the parts having a male portion engaged in a female portion of the other part, the male and female portions respectively having a first guide surface and a second guide surface facing each other in such a manner that, in the event of the pin breaking, the driving part is capable of moving relative to the driven part in the travel direction, the pin extending perpendicularly to said direction through corresponding holes made in the male and female portions, the coupling being characterized in that the hole made in the male portion opens out in the bottom of a setback in the second guide surface, and the setback has a depth that is such that the pin works essentially in shear and that is greater than a theoretical height of a bead formed in the zone where the pin bears against the bottom of the setback when the pin breaks, the second guide surface for guiding the male portion being cylindrical and the setback being an annular groove.

2. The coupling according to claim 1, wherein the driving part is arranged to turn about an axis of rotation and the groove has an axis of revolution that coincides with the axis of rotation of the driving part.

3. The coupling according to claim 2, wherein the setback has a depth lying in the range about 0.1 mm to 0.3 mm.

4. The coupling according to claim 1, wherein the setback has a depth lying in the range about 0.1 mm to 0.3 mm.

5. The coupling according to claim 1, wherein the parts and the pin are made of the same material.

* * * * *